UNITED STATES PATENT OFFICE.

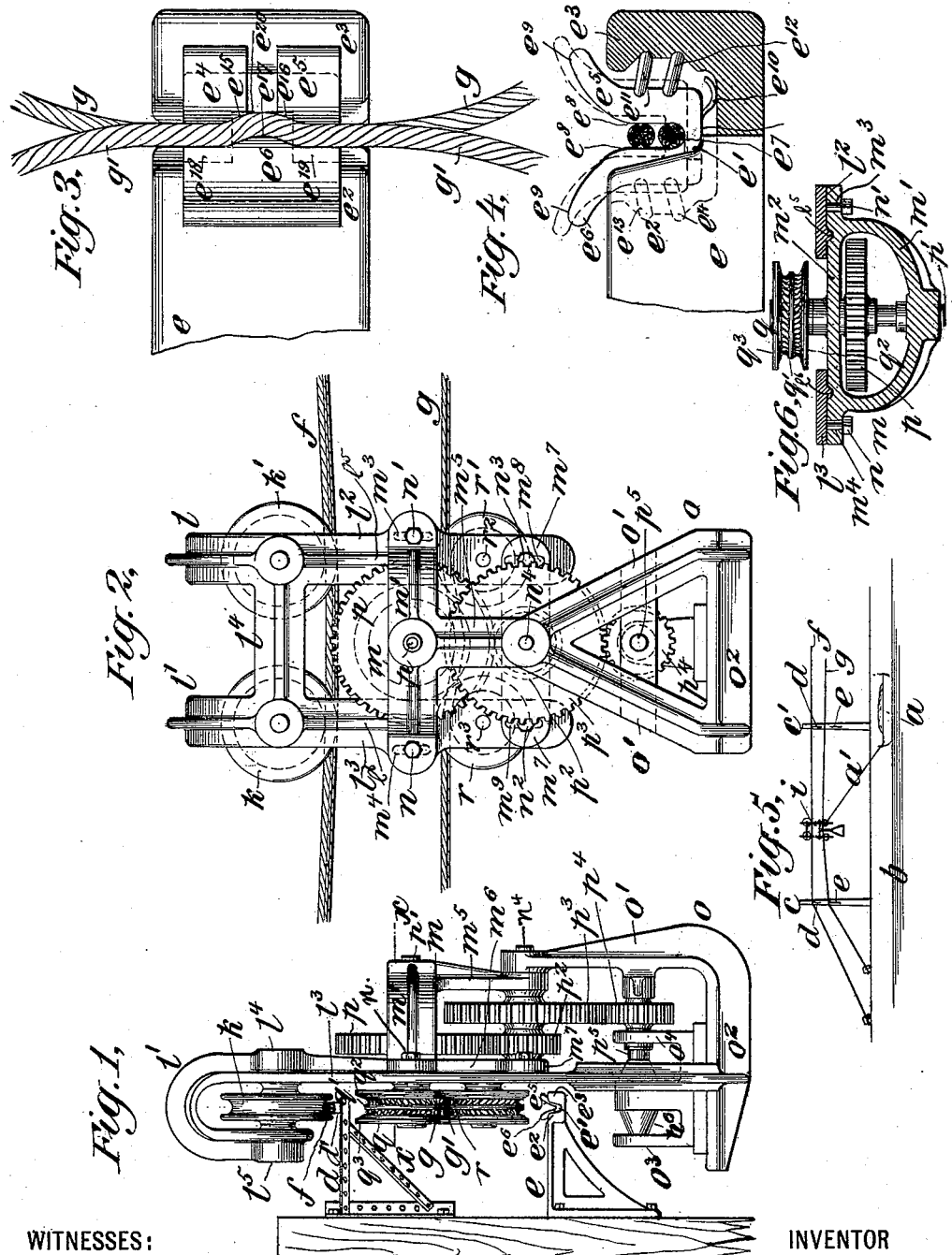

THOMAS SPENCER MILLER, OF SOUTH ORANGE, NEW JERSEY.

TOWING CANAL-BOATS, &c.

SPECIFICATION forming part of Letters Patent No. 601,353, dated March 29, 1898.

Application filed December 14, 1895. Renewed December 2, 1897. Serial No. 660,552. (No model.)

*To all whom it may concern:*

Be it known that I, THOMAS SPENCER MILLER, a citizen of the United States, and a resident of South Orange, in the county of Essex and State of New Jersey, have invented certain new and useful Improvements in Conveying Apparatus, of which the following is a specification.

In the accompanying drawings I have shown an apparatus designed especially for the towing of canal-boats, which, however, may be employed for the purpose of hauling other objects.

Figure 1 is an end view of the carriage with the supports for the cable and traction-ropes. Fig. 2 is a side view of the carriage. Fig. 3 is a plan view in detail of one of the supports for the traction-ropes. Fig. 4 is an end view of the same, partly in section. Fig. 5 is a diagram in side view of the system. Fig. 6 is a detail plan section on the line $x$ $x$ of Fig. 1.

$a$ is a canal-boat floating in the canal $b$.

$c$ $c'$ are posts or other supports, each of which carries upon its face toward the canal a bracket $d$ and another bracket $e$ below, as shown in Fig. 1.

$f$ is a cable anchored at both ends and supported by the bracket $d$ on each of the posts, to which bracket it is fixed by a clamp $d'$.

$g$ $g'$ are traction-ropes laid parallel side by side and anchored at both ends and supported at each post by the bracket $e$. Interposed between these traction-ropes and each of the brackets is placed mechanism, which I will now describe, which permits the traction-ropes to be lifted off of their support upon the bracket $e$, but when the traction-ropes rest upon said supports will grip the traction-ropes and oppose any longitudinal strain upon the traction-ropes tending to pull them through such grip. Thereby the longitudinal strain applied to the traction-ropes at various points along their length is borne by the bracket or brackets adjacent to or near by the point at which such strain occurs.

$a'$ is a tow-line connecting the canal-boat or vehicle with the carriage.

The same mechanism being applied to each bracket $e$, a description of one will answer for all. The bracket $e$ is cast with an opening $e'$, bounded on each side by an upward projection $e^2$ and $e^3$. On one of these upward projections are mounted the dogs $e^4$ and $e^5$, and on the other is mounted a dog $e^6$. Each of these dogs is in the form shown in Figs. 3 and 4. Fig. 4 represents by full and dotted lines the two positions between which the dogs are capable of moving. The traction-ropes $g$ $g'$ are gripped between the dogs on the projection $e^3$ and the dog on the projection $e^4$ when such traction-ropes are supported by the bracket $e$. The dog $e^6$ is opposite the space between the dogs $e^4$ and $e^5$, so as to produce a bend in the ropes $g$ $g'$ and insure firmness of hold against longitudinal strain, as shown in Fig. 3.

The active face of each dog consists of a rope-rest $e^7$, an upward extension therefrom $e^8$, and an outwardly-flaring extension therefrom $e^9$. Therefore when the dogs are combined they present an opening for the traction-rope, consisting of a rest on each dog at the bottom, an upwardly-extending slot widening on both sides at the top, as shown in end view at Fig. 4. The plan view of this slot is shown in Fig. 3, where the edges of the dogs $e^4$ and $e^5$ are beveled off at $e^{15}$ and $e^{16}$, and the face of the dog $e^6$ is curved forward at $e^{17}$, so that the combined opposed faces of the dogs correspond with the bend of the ropes. (Shown in Fig. 3.) The projections of the dogs $e^4$, $e^5$, and $e^6$ underneath the ropes are shown, respectively, in dotted lines in Fig. 3 at $e^{18}$, $e^{19}$, and $e^{20}$. The spring $e^{10}$ is interposed between the bottoms of the dogs and the bracket $e$, so as to urge the dogs upward when relieved from the weight of the traction-ropes. $e^{11}$ and $e^{12}$ are parallel links interposed between the outside of the dogs $e^4$ and $e^5$ and the bracket extension $e^3$. $e^{13}$ $e^{14}$ are parallel links interposed between the outside of the dog $e^6$ and the bracket extension $e^2$. These links, when arranged as shown in Fig. 4, act as toggles to compel the dogs on opposite sides of the ropes to approach each other in moving downward, but permit them to recede from each other in moving upward, as indicated by the dotted lines. Consequently when the dogs are relieved from the weight of the traction-ropes $g$ $g'$ they will be forced upward and outward by the spring $e^{10}$ into the position shown in dotted lines; but when the weight of the traction-ropes $g$ $g'$ rests upon the dogs they will be forced downward and toward each other in antagonism to the spring $e^{10}$ into the position shown in full lines in Fig. 4, so as to powerfully grip the traction-ropes.

I will now proceed to describe the main carriage $i$, which is shown in Fig. 1 as having lifted the traction-ropes off of their support on the bracket $e$.

$k\ k'$ are two wheels running on the cable $f$ and carrying the carriage. These wheels are journaled at opposite ends of their axles in the carriage-frame, which extends in two loops $l\ l'$ above the wheels, and thence downward on one side of the same into the arms $l^2\ l^3$. The loops $l\ l'$ are joined together at the axles of the wheels by the longitudinal frame-pieces $l^4\ l^5$.

$m$ is a separate frame consisting of the following parts:

$m'$ is a bridge-piece bridging the wheel $p$, and a longitudinal frame member $m^2$ connects the extremities of the bridge-piece and is provided with slots $m^3\ m^4$ at its extremities. Depending from the bridge-piece $m'$ is a hanger $m^5$, and depending from the member $m^2$ is a hanger $m^6$, at the bottom of which is a longitudinal frame member $m^7$, provided at its extremities with the slots $m^8$ and $m^9$.

$n$, $n'$, $n^2$, and $n^3$ are bolts passing through the slots already referred to in the frame $m$ and connecting the same with the frame members $l^2$ and $l^3$, so that the frame $m$ is held against said frame members $l^2$ and $l^3$ and guided vertically thereon by the slotted connections.

$n^4$ is a shaft journaled in the frame members $m^5$ and $m^7$. Upon the end of the shaft $n^4$ is journaled a swinging motor-frame $o$, consisting of a vertical part $o'$ and a platform part $o^2$.

$p'$ is a shaft journaled in the frame members $m'$ and $m^2$, upon which are fixed the gear-wheel $p$ and the presser-wheel $q$.

$p^2$ and $p^3$ are gear-wheels fixed upon the shaft $n^4$, $p^2$ meshing into the gear-wheel $p$ and $p^3$ meshing into a gear-wheel $p^4$, fixed on a motor-shaft $p^5$. The motor-shaft $p^5$ is journaled in the frame member $o'$ and the uprights $o^3$ and $o^4$ on the platform $o^2$. I have represented at $p^6$ the armature of an electric motor fixed to the shaft $p^5$; but I do not wish to limit myself to an electric motor.

$r$ and $r'$ are wheels similar in construction to each other, which are journaled upon the studs $r^2$ and $r^3$, fixed to the frame members $l^2$ and $l^3$, respectively.

$l^5$ and $l^6$ are flanges on the frame members $l^2$ and $l^3$, that assist the bolts in guiding the presser-frame.

All the parts of the carriage $i$ are so disposed as to bring the center of gravity in a vertical plane passing through the cable $f$ and so that the traction-ropes $g$ and $g'$ will be held by the wheels $q$, $r$, and $r'$ vertically above the rest for the same on the bracket $e$.

The traction-ropes $g$ and $g'$ are wire ropes, and the strands of one rope are twisted inversely to the strands of the other, as shown in Fig. 3. The wheel $q$ is constructed with an imprint on its periphery of the upper surface of the ropes $g\ g'$, with which it comes in contact. Each of the wheels $r$ and $r'$ is constructed with an imprint on its periphery of the lower surface of the ropes $g$ and $g'$, with which they come in contact. On each wheel the imprint for the surface of the rope $g$ is separated from the imprint for the surface of the rope $g'$ by a flange $q'$, and on each wheel both ropes are held between the two end flanges $q^2$ and $q^3$, as shown in Fig. 1. The wheels $r$ and $r'$ are separated, as shown in Fig. 2, and the wheel $q$ bears upon the ropes $g\ g'$ above the space between the wheels $r$ and $r'$, so as to produce a depression in the ropes $g$ and $g'$ between the wheels $r$ and $r'$ and insure a proper hold upon such ropes.

From the above description it will be seen that the means for causing tractional friction between the car or carriage $i$ and the traction-ropes $g\ g'$ is dependent on the weight of the apparatus, because the tractional friction is caused by the downward pressure of the presser-wheel $q$ upon the traction-ropes $g\ g'$, resting on wheels $r\ r'$, and this downward pressure is produced by the weight of all the parts of the apparatus carried by the sliding frame $m$, which preferably includes the gears $p\ p^2\ p^3$, the frame $o$, and the motor carried thereby, which weight is enabled to act through the presser-wheel $q$ by the slotted connection between the reciprocating or presser-frame $m$ and the main or truck frame members $l^2\ l^3$.

The apparatus operates as follows: When the car or carriage $i$ is in the position shown in Fig. 5, between the supports $d$, the traction-ropes $g\ g'$ will at each support rest upon and be clamped by the dogs on that support, as shown in Figs. 3 and 4. Thus the support, for the time being in advance of the car, will sustain, partially or wholly, the traction strain of such car upon the ropes $g\ g'$. In Figs. 3 and 4 the ropes $g$ and $g'$ are shown between the dogs as vertically, one above the other, whereas their normal position when not engaged by the dogs is side by side. This change from the side-by-side position to the vertical position they will assume naturally as they fall into the slotted opening between the dogs and as the dogs close upon them. When the car or carriage $i$ is passing any one of the supports, as shown in Fig. 1, the traction-ropes $g$ and $g'$ will be lifted off of the dogs on that support by the wheels $r$ and $r'$ to a sufficient height to permit the wheels $r$ and $r'$ to pass above the dogs, as shown in Fig. 1. Thus when the car is not passing a support the support will hold the traction-ropes both laterally and longitudinally. When the car is passing a support, it will itself support the traction-ropes, and all the time the traction-clutch between the car and the traction-ropes will be maintained by the weight of the apparatus, acting through the presser-wheel $q$.

I have shown the wheel $q$ as driven and the wheels $r\ r'$ as not driven, and this arrangement possesses advantages by reason of facilitating the transmission of power from the motor on the platform to the driven wheel; but the reverse might be the case—that is to say, the wheels $r\ r'$ might be driven and the wheel $q$ not driven, or all three wheels might be driven.

The frame may be conveniently considered as composed of three parts—the truck-frame, carrying the bearings for the wheels $k$ and $k'$, the presser-frame $m$, carrying the presser-wheel $q$, and the motor-frame $o$, carrying the motor; but I do not wish to be understood as limiting myself to the means by which these frames are connected, or in all cases to the distinct existence of all of them.

I have shown a cable as employed as a track for the support of the car, not only at the points of passing the posts $d$, but also between the posts, so that the traction-ropes are not called upon to support the car; but I do not wish to limit myself to this construction. The track performing the supporting function of the cable might be employed only at the posts, the car being supported by the traction-ropes between the posts and the support of the car being transferred from the traction-rope to the track at the posts, so as to lift the traction-rope out of its bearing on the bracket $e$, as already described. In this case suitable mechanism will be interposed between the truck-frame and the presser-frame to maintain the grip of the wheels on the traction-cables when the traction-cables are supporting the carriage between the posts.

I claim—

1. In a conveying-apparatus car, in combination, a truck-frame, a presser-frame, means of connection between said frames permitting of vertical movement of the presser-frame, traction-rope-clutching members mounted respectively on said truck-frame and said presser-frame and a motor supported by said presser-frame; whereby the weight of the apparatus is utilized to clutch the traction-rope, substantially as described.

2. In a conveying-apparatus car, in combination, a truck-frame, a presser-frame, two traction-rope-clutching members mounted respectively on said truck-frame and said presser-frame, a motor supported by said presser-frame and connecting mechanism also supported by said presser-frame whereby the clutching member supported upon said presser-frame is driven from said motor, substantially as described.

3. In a conveying-apparatus car, in combination, a truck-frame, a presser-frame, means of connection admitting of vertical movement between the two, traction-rope-clutching members mounted respectively on said truck-frame and said presser-frame and a motor-frame pendent from said presser-frame, substantially as described.

4. In a conveying apparatus, in combination with a car, a motor carried by said car, a member mounted upon said car adapted to travel upon a supporting-cable, a clutch in addition to said parts mounted upon said car and adapted to clutch a traction-rope, and means whereby the pressure by said clutch against said traction-rope is produced by the weight of the apparatus, substantially as described.

5. In a conveying apparatus, in combination, a car, a motor carried by said car, a member mounted upon said car adapted to travel upon a supporting-cable, a wheel mounted upon said car and revolved by said motor, a member acting in opposition to said wheel to clutch a traction-rope, and means whereby the pressure of said clutch is produced by the weight of the apparatus, substantially as described.

6. In a conveying apparatus, in combination, a car, a motor carried by said car, a member mounted upon said car adapted to travel upon a supporting-cable, a clutch in addition to said parts mounted upon said car and adapted to clutch a traction-rope, means whereby the pressure of said clutch against said traction-rope is produced by the weight of the apparatus, and means for connecting a tow-line with said car, substantially as described.

7. In a conveying apparatus, in combination, a car, a motor carried by said car, a clutch, means mounted upon said car adapted for causing tractional friction between the car and a traction-rope, a stationary support containing two surfaces adapted for clutching the traction-rope; one of said surfaces being mounted upon a dog, and a toggle-link whereby said dog is forced toward said other surface, substantially as described.

8. In a conveying apparatus, in combination, a car, a motor carried by said car, a member mounted upon said car adapted to travel upon a supporting-cable, a wheel having upon its periphery the imprint of the strands of two inversely-twisted traction-ropes, a member adapted to clutch a traction-rope against said wheel, means whereby said wheel is operatively connected with said motor and means adapted to produce the clutching pressure, substantially as described.

9. In a conveying apparatus, in combination with a car, a traction-wheel mounted upon said car and having upon its periphery an imprint of the contact-surface of two parallel traction-ropes and a member also mounted upon the car whereby said traction-ropes are held against said wheel, substantially as described.

10. In a conveying apparatus, in combination with a car, a traction-wheel mounted upon said car and having upon its periphery an imprint of the contact-surface of two inversely-twisted traction-ropes and a member also mounted upon the car whereby said traction-ropes are held against said wheel, substantially as described.

11. In a conveying apparatus, in combination, a carriage, a supporting-cable, two parallel traction-ropes and a support for said traction-ropes and a grip whereby both of said traction-ropes are held together, substantially as described.

12. In a conveying apparatus, in combination, a traction-rope, a support for said traction-rope, dogs mounted on said support on opposite sides of the traction-rope and a toggle-lever by which one of said dogs is forced toward another, substantially as described.

13. In a conveying apparatus, a truck containing a wheel adapted to travel upon a supporting-cable, a frame supported by said truck, a motor mounted upon said frame, a traction-wheel also mounted upon said frame and operatively connected with said motor, a member mounted upon said truck opposite to said traction-wheel; the connection between said frame and said truck permitting of movement between said traction-wheel and said opposed member, substantially as described.

14. In a conveying apparatus, in combination, a car, means mounted upon said car adapted to produce tractional friction with two traction-ropes, separate means mounted upon said car adapted to travel upon a supporting cable or trackway, a fixed support separate from the carriage adapted to grip two traction-ropes and a support for a cable or trackway in such position that the cable or trackway will be held so as to support the carriage in passing said traction-rope support, substantially as described.

15. In a conveying apparatus, in combination, a car, a traction-wheel mounted upon said car having upon its periphery the imprint of the strands of inversely-twisted ropes, a motor mounted upon said car whereby said wheel is driven and a presser acting in opposition to said wheel and a separate member mounted upon said carriage adapted to travel upon a supporting-cable, substantially as described.

16. In a conveying apparatus, in combination, a car, a traction-wheel mounted upon said car having upon its periphery the imprints of the strands of inversely-twisted ropes, a motor mounted upon said car whereby said wheel is driven, a pressure-wheel acting in opposition to said traction-wheel and having upon its periphery the imprint of the strands of inversely-twisted traction-ropes, substantially as described.

17. In a conveying apparatus, in combination, a carriage truck-frame, a carriage presser-frame, two wheels mounted upon one of said frames at a distance apart and adapted to engage a rope on one side, a wheel mounted upon the other of said frames and adapted to engage a rope on the opposite side between the two wheels first named and means for driving one of said wheels whereby the weight of the apparatus causes a bend in the rope between said two wheels first mentioned, substantially as described.

18. In a conveying apparatus, in combination, a carriage, a traction-rope, a support for said traction-rope, the dogs $e^4$, $e^5$, $e^6$ provided with projections $e^{18}$, $e^{19}$ and $e^{20}$ extending underneath the rope; the bearing-surface of said dogs above said projections being crooked, substantially as described.

19. In combination, a support $e$ provided with the projections $e^2$ and $e^3$, the dogs, the toggle-links interposed between said dogs and said projections and the spring $e^{10}$, substantially as described.

20. In a conveying-apparatus car, in combination, a truck-frame, a presser-frame, the shafts $p'$ and $n^4$ supported by said presser-frame, a gear-wheel $p$ and a traction-rope-engaging wheel carried by said shaft $p'$, gear-wheels $p^2$ and $p^3$ carried by said shaft $n^4$, a motor-frame pendent from said presser-frame, a motor mounted upon the same and means of power transmission between said motor and said gear $p^3$, substantially as described.

21. In a conveying-apparatus car, in combination, a truck-frame containing a downward extension on one side of the trackway, a presser-frame, means whereby said presser-frame is secured to said downward extension and guided so as to have a vertical reciprocation thereon, rope-gripping members mounted, respectively, on said truck-frame and presser-frame, a motor and mechanism connecting said motor with said presser-frame whereby the weight of the motor presses together said gripping members, substantially as described.

22. In a conveying apparatus, a car, gripping members on said car adapted to hold two traction-ropes side by side with one rope above the other, a fixed traction-rope support and mechanism on said support adapted to hold said ropes one above the other, substantially as described.

THOS. SPENCER MILLER.

Witnesses:
C. C. IVORY,
WALTER L. PIERCE.